United States Patent
Yamada et al.

(10) Patent No.: US 10,620,036 B2
(45) Date of Patent: Apr. 14, 2020

(54) ATTACHMENT MONITORING SYSTEM

(71) Applicant: TOKU PNEUMATIC CO., LTD., Hakata-Ku (JP)

(72) Inventors: Hideki Yamada, Hakata-Ku (JP);
Yasuo Hirokawa, Hataka-Ku (JP);
Shunichi Sakamoto, Hataka-Ku (JP);
Junji Takai, Kitakyushu (JP);
Masayuki Obata, Kitakyushu (JP)

(73) Assignee: TOKU PNEUMATIC CO., LTD., Hakata-Ku (JP)

( * ) Notice: Subject to any disclaimer, the term of this patent is extended or adjusted under 35 U.S.C. 154(b) by 168 days.

(21) Appl. No.: 15/497,888

(22) Filed: Apr. 26, 2017

(65) Prior Publication Data
US 2017/0314987 A1 Nov. 2, 2017

(30) Foreign Application Priority Data

Apr. 28, 2016 (JP) .................. 2016-090326
Dec. 5, 2016 (JP) .................. 2016-235620

(51) Int. Cl.
*G01H 1/00* (2006.01)
*E02F 3/32* (2006.01)
(Continued)

(52) U.S. Cl.
CPC ................. *G01H 1/00* (2013.01); *E02F 3/32* (2013.01); *E02F 3/966* (2013.01); *E02F 9/2054* (2013.01);
(Continued)

(58) Field of Classification Search
CPC ......... G01H 1/00; G01L 19/06; G01M 13/00; E02F 9/2221; E02F 9/264; E02F 9/267
See application file for complete search history.

(56) References Cited

U.S. PATENT DOCUMENTS

| 5,142,908 A | 9/1992 | Chamblin, Sr. et al. |
| 6,510,902 B1 * | 1/2003 | Prokop .................. E02F 3/966 173/1 |

(Continued)

FOREIGN PATENT DOCUMENTS

| DE | 10 2010 016 492 A1 | 10/2011 |
| JP | 2003-43061 | 2/2003 |

(Continued)

OTHER PUBLICATIONS

Office Action (Notification of Reasons for Refusal of Japanese application) issued in JP 2016-090326 dated Oct. 11, 2016 (with English Translation).

(Continued)

*Primary Examiner* — Sujoy K Kundu
*Assistant Examiner* — Terence E Stifter, Jr.
(74) *Attorney, Agent, or Firm* — Oblon, McClelland, Maier & Neustadt, L.L.P.

(57) ABSTRACT

An attachment monitoring system according to an embodiment includes a working machine, attachments, a measurement unit, a terminal device, and a server device. The working machine includes a working arm. Each of the attachments is attached to a leading end part of the working arm so as to be driven by a fluid pressure. The measurement unit is provided to measure at least one of a vibration and the fluid pressure when each of the attachments identified on the basis of individual identifying information is driven. The terminal device is provided in the working machine to acquire measured results of the measurement unit. The server device collects the measured results of the respective attachments from the terminal device, and analyzes operation states of the respective attachments on the basis of the collected measured results.

11 Claims, 10 Drawing Sheets

(51) Int. Cl.
*E02F 9/22* (2006.01)
*E02F 9/26* (2006.01)
*G01L 19/06* (2006.01)
*G01M 13/00* (2019.01)
*E02F 3/96* (2006.01)
*E02F 9/20* (2006.01)
*E02F 9/08* (2006.01)
*E02F 9/16* (2006.01)

(52) U.S. Cl.
CPC ............ *E02F 9/2221* (2013.01); *E02F 9/264* (2013.01); *E02F 9/267* (2013.01); *G01L 19/06* (2013.01); *G01M 13/00* (2013.01); *E02F 9/0883* (2013.01); *E02F 9/163* (2013.01); *E02F 9/2271* (2013.01); *E02F 9/2296* (2013.01); *E02F 9/26* (2013.01)

(56) References Cited

U.S. PATENT DOCUMENTS

| | | | |
|---|---|---|---|
| 6,737,981 | B2 | 5/2004 | Hagemeister et al. |
| 7,406,399 | B2 | 7/2008 | Furem et al. |
| 7,904,225 | B2* | 3/2011 | Takeda .................. B25D 9/145 340/438 |
| 8,690,261 | B2* | 4/2014 | Tang ....................... E02F 3/966 299/37.2 |
| 8,704,507 | B2 | 4/2014 | Oksman et al. |
| 2008/0201108 | A1 | 8/2008 | Furem et al. |
| 2012/0250815 | A1* | 10/2012 | Oksman .................. B25D 9/00 377/16 |
| 2014/0150304 | A1 | 6/2014 | Sherlock et al. |
| 2015/0176254 | A1* | 6/2015 | Blakeman ............. E02F 3/3618 701/50 |
| 2016/0237657 | A1* | 8/2016 | Carpenter ............... E02F 9/267 |
| 2017/0372534 | A1* | 12/2017 | Steketee .............. G06Q 10/087 |

FOREIGN PATENT DOCUMENTS

| | | |
|---|---|---|
| JP | 2003-117853 | 4/2003 |
| JP | 2010-273344 | 12/2010 |
| JP | 2013-514893 | 5/2013 |
| JP | 2013-224568 | 10/2013 |
| JP | 2016-8416 | 1/2016 |
| WO | WO 2016/115499 A1 | 7/2016 |

OTHER PUBLICATIONS

Extended European Search Report dated Sep. 29, 2017 in Patent Application No. 17168151.3.

* cited by examiner

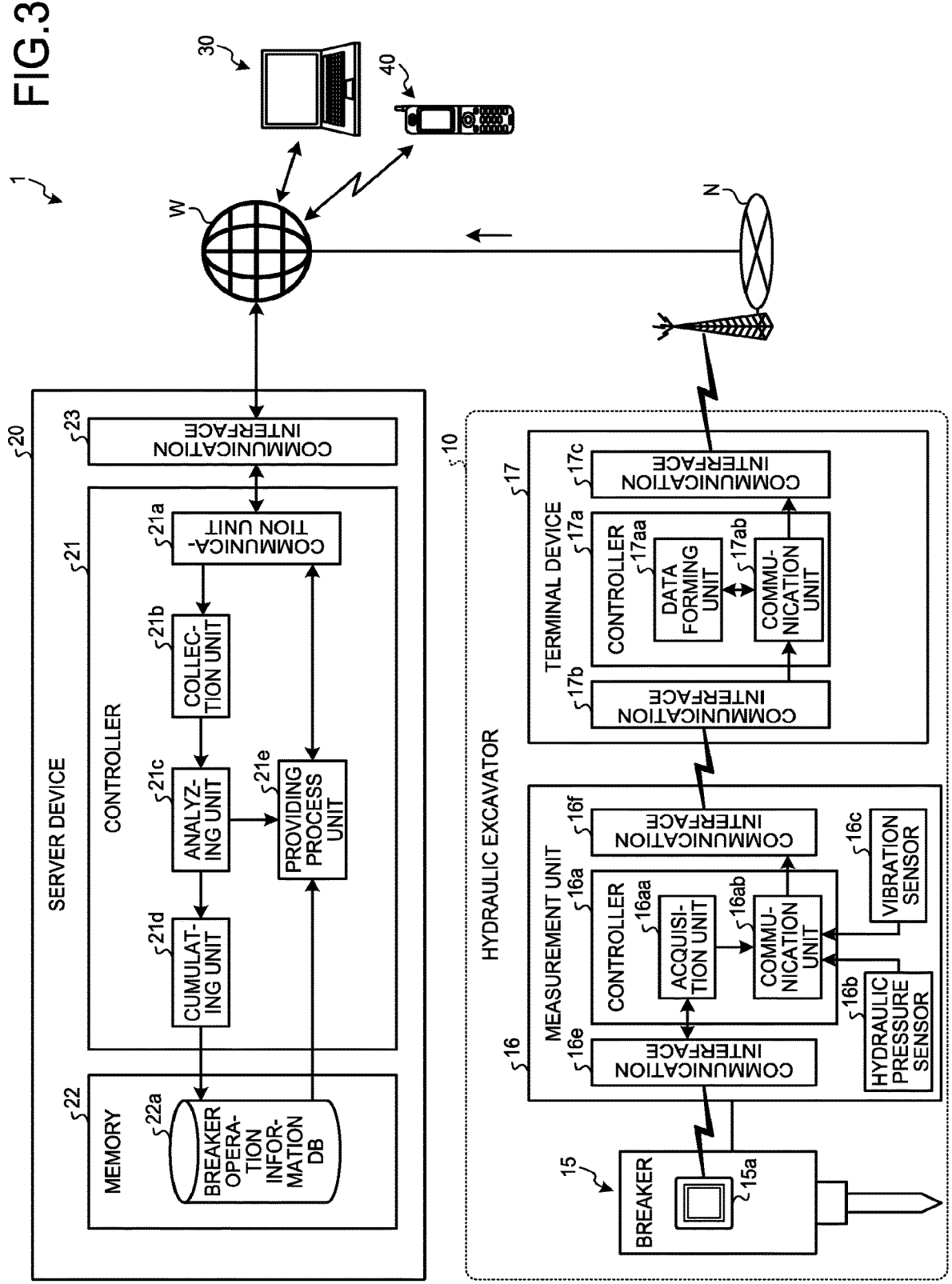

FIG.4A

| INDIVIDUAL IDENTIFYING INFORMATION OF BREAKER | DETECTED RESULT OF HYDRAULIC PRESSURE SENSOR | DETECTED RESULT OF VIBRATION SENSOR | ... |
|---|---|---|---|

FIG.4B

| INDIVIDUAL IDENTIFYING INFORMATION OF BREAKER | DETECTED RESULT OF HYDRAULIC PRESSURE SENSOR (FORMED) | DETECTED RESULT OF VIBRATION SENSOR (FORMED) | PRESENT POSITION | ... |
|---|---|---|---|---|

FIG.5A

| INDIVIDUAL IDENTIFYING INFORMATION OF BREAKER | ACCUMULATED OPERATION TIME | PRESENT POSITION | PRESENT STATUS | |
|---|---|---|---|---|
| BR_1 | XX:XX:XXh | 33°35'50.0"N 130°25'25.7"E | NORMAL | |
| BR_2 | YY:YY:YYh | 33°51'30.5"N 130°45'30.3"E | ATTENTION CALLING | ... |
| BR_3 | ZZ:ZZ:ZZh | 35°33'20.4"N 139°43'17.9"E | ABNORMALITY | |
| ⋮ | ⋮ | ⋮ | ⋮ | |

| | CONNECTED MACHINE | ALARM HISTORY | LEASE HISTORY | ... |
|---|---|---|---|---|
| | DIG_1 | ... | ... | ... |
| ... | DIG_2 | ... | ... | ... |
| | RBT_1 | ... | ... | ... |
| | ⋮ | ⋮ | ⋮ | ⋮ |

FIG.5B

| ACCUMULATED OPERATION TIME | | | |
|---|---|---|---|
| NORMAL STRIKING TIME | BLANK BLOWING TIME | SWEEPING TIME | ... |

ATTACHMENT MONITORING SYSTEM

CROSS-REFERENCE TO RELATED APPLICATIONS

This application is based upon and claims the benefit of priority of the prior Japanese Patent Application No. 2016-090326, filed on Apr. 28, 2016; and Japanese Patent Application No. 2016-235620, filed on Dec. 5, 2016, the entire contents of both of which are incorporated herein by reference.

FIELD

The embodiments discussed herein are directed to an attachment monitoring system.

BACKGROUND

Conventionally, there is known a technology that monitors an operation time and the like of a construction machine such as hydraulic excavator and bulldozer.

For example, a technology disclosed in Japanese Laid-open Patent Publication No. 2013-224568 detects machine information on functions mainly of a construction machine as a moving body, such as an engine, rotation bodies, underbody parts, and other devices (air conditioner and the like), so as to specify the next scheduled maintenance date of the construction machine on the basis of this machine information.

However, when the aforementioned conventional technology is employed, the scheduled maintenance date of the construction machine itself can be specified, but an operation state of an attachment, such as a hydraulic breaker, which is attached to a working arm of the construction machine is not grasped.

The attachment is lent in some cases to an end user by, for example, a lease contract, and in this case, the same attachment is attached to a plurality of different construction machines while changing a combination therebetween so as to be used. Therefore, an operation state of an individual attachment does not commonly coincide with that of a construction machine.

Each time when a combination with a construction machine changes, a setting work including installation is performed on the attachment, and thus the possibility of inducing a failure caused by a setting trouble is high.

This problem commonly exists, not limited to a construction machine, in a working machine in which an attachment is attached to a working arm thereof and that can perform a predetermined work by using this attachment.

SUMMARY

An attachment monitoring system according to an aspect of embodiments includes a working machine, attachments, a measurement unit, a terminal device, and a server device. The working machine includes a working arm. Each of the attachments is attached to a leading end part of the working arm so as to be driven by a fluid pressure. The measurement unit is provided to measure at least one of a vibration and the fluid pressure when each of the attachments identified on the basis of individual identifying information is driven. The terminal device is provided in the working machine to acquire measured results of the measurement unit. The server device collects the measured results of the respective attachments from the terminal device, and analyzes operation states of the respective attachments on the basis of the collected measured results.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram illustrating the breaker monitoring system according to the first embodiment;

FIG. 4A is a diagram illustrating one example of a format of data transmitted by the measurement unit;

FIG. 4B is a diagram illustrating one example of a format of data transmitted by a terminal device;

FIG. 5A is a diagram illustrating one example of a format of data cumulated in a breaker operation information database;

FIG. 5B is a diagram illustrating a modification of "accumulated operation time" illustrated in FIG. 5A;

DESCRIPTION OF EMBODIMENTS

Hereinafter, an attachment monitoring system disclosed in the present application will be described in detail with reference to accompanying drawings. In addition, the disclosed technology is not limited to the embodiments described below.

Hereinafter, a case where an attachment is a hydraulic breaker and a working machine to which this hydraulic breaker is attached is "hydraulic excavator" will be explained as a main example. Hereinafter, the hydraulic breaker will be referred to as "breaker".

Hereinafter, in a case where there exists a plurality of similar composing elements, numbering is performed by adding "-n" (n is natural number) on each of the reference symbols of these composing elements so that they can be individually identified. Moreover, when collectively referring to these composing elements, the aforementioned numbering is not performed. Hereinafter, a first embodiment will be explained with reference to FIGS. 1A to 7B, a second embodiment will be explained with reference to FIG. 8, a third embodiment will be explained with reference to FIG. 9, and a fourth embodiment will be explained with reference to FIG. 10.

First Embodiment

Figure 1A:
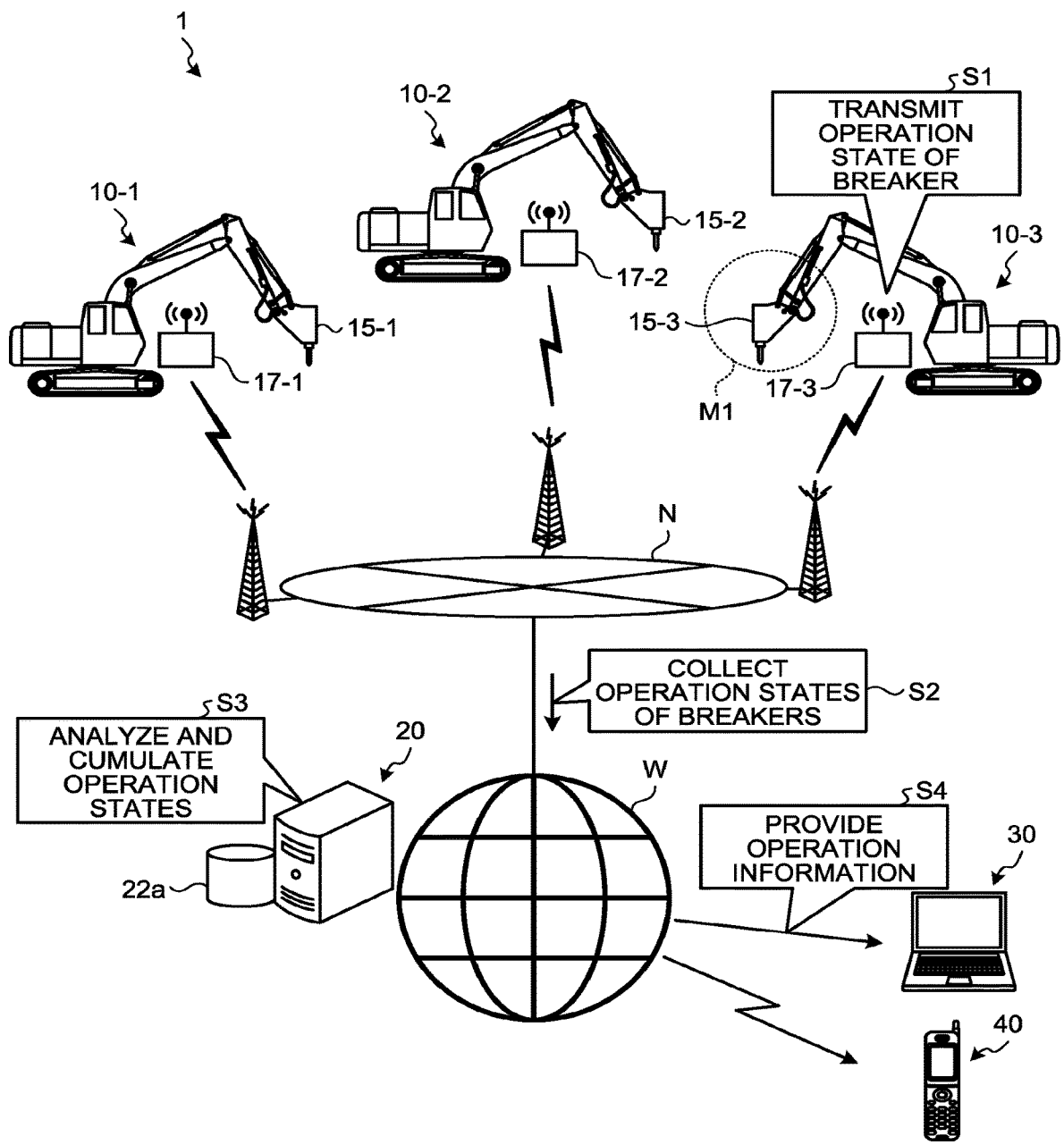
FIGS. 1A to 1C are diagrams illustrating the outlines of a breaker monitoring system according to a first embodiment.
Figure 1B:
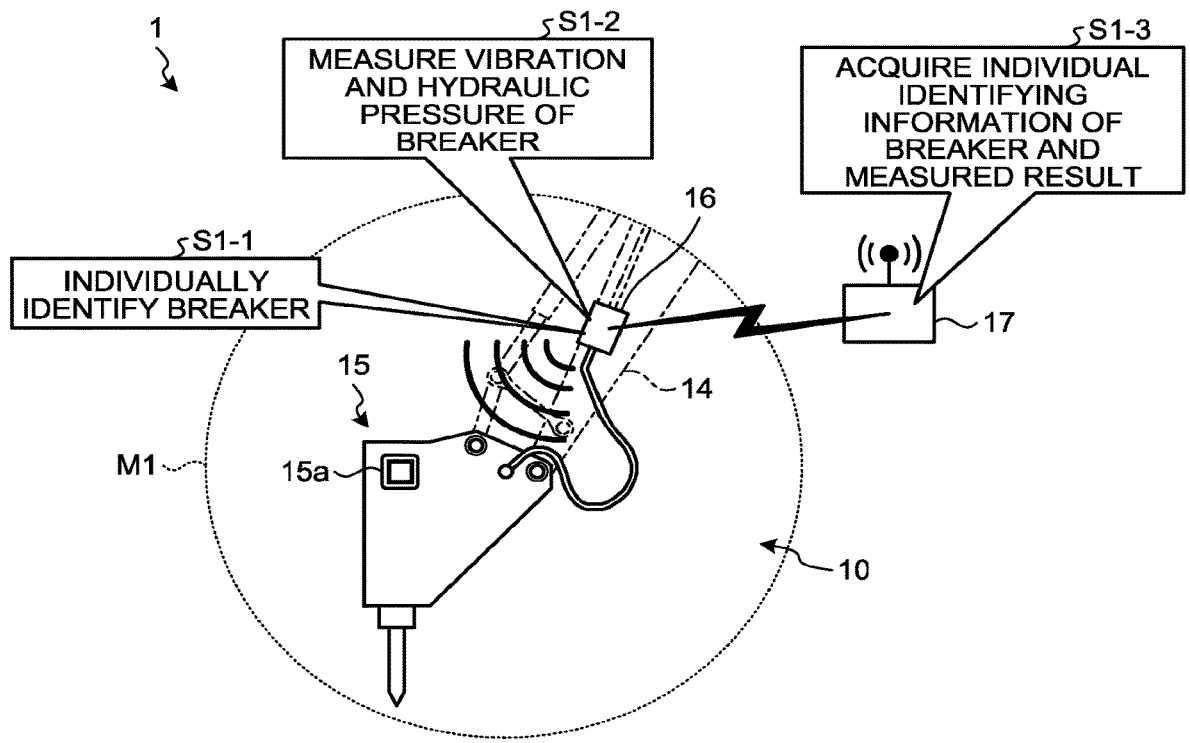
Figure 1C:
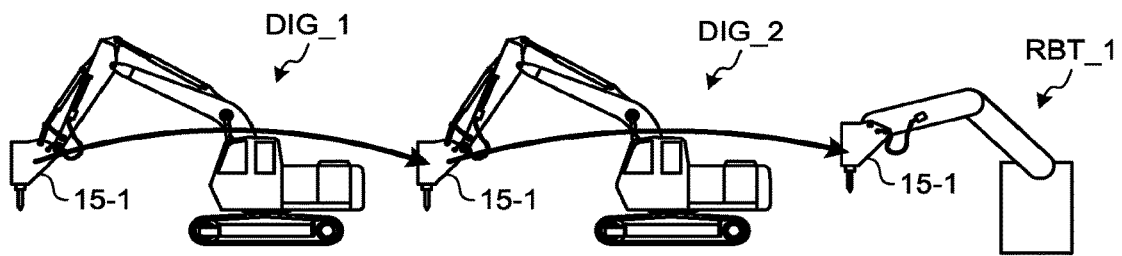

First, the outline of a breaker monitoring system according to the first embodiment will be explained with reference to FIGS. 1A to 1C. FIGS. 1A to 1C are diagrams illustrating the outlines of a breaker monitoring system 1 according to the present embodiment.

As illustrated in FIG. 1A, the breaker monitoring system 1 includes a plurality of hydraulic excavators 10, a network N, an Internet W, a server device 20, various terminals 30 and 40. In FIG. 1A, for convenience of explanation, three hydraulic excavators 10-1, 10-2, and 10-3 are illustrated, however needless to say, the number of the hydraulic excavators 10 is not limited thereto.

Breakers 15-1, 15-2, and 15-3 are attached to the respective hydraulic excavators 10-1, 10-2, and 10-3, and terminal devices 17-1, 17-2, and 17-3 are attached to the respective hydraulic excavators 10-1, 10-2, and 10-3.

Each of the terminal devices 17-1, 17-2, and 17-3 transmits, to the network N, an operation state of the corresponding one of breakers 15-1, 15-2, and 15-3 (Step S1). The network N is, for example, a mobile telephone line network.

Herein, a method for acquiring an operation state of a breaker 15 will be explained with reference to FIG. 1B, which is an enlarged part M1 illustrated in FIG. 1A, and FIG. 1C. As illustrated in FIG. 1B, the breaker monitoring system 1 includes a measurement unit 16.

The measurement unit 16 is attached to an arm 14 (corresponding to one example of "working arm") of the hydraulic excavator 10. The measurement unit 16 is provided to measure a vibration and a hydraulic pressure of the driven breaker 15 that is identified on the basis of individual identifying information.

An individual identification of the breaker 15 is performed by using, for example, a Radio Frequency IDentifier (RFID). Specifically, for example, an Integrated Circuit (IC) tag 15a, in which individual identifying information is memorized, is pasted on the breaker 15, and thus this individual identifying information of the breaker 15 is held on the breaker 15 side.

In this case, the measurement unit 16 is provided to read individual identifying information of an IC tag 15a by using wireless communication. For example, when the IC tag 15a is a passive tag, the measurement unit 16 transmits an electric wave to the IC tag 15a and receives individual identifying information that is put on a reflected wave of the electric wave and is returned thereto so as to individually identify the breaker 15 (Step S1-1).

Herein, the case in which the IC tag 15a is a passive tag is exemplified. However, the IC tag 15a may be an active tag or a semi-active tag. Moreover, the RFID is not needed to be used. Therefore, wired communication may be employed.

As is specifically illustrated in FIG. 2B and the later, the measurement unit 16 includes a hydraulic pressure sensor 16b and a vibration sensor 16c. The measurement unit 16 measures a vibration and a hydraulic pressure of the breaker 15 by using this hydraulic pressure sensor 16b and this vibration sensor 16c (Step S1-2). In the present embodiment, with respect to hydraulic oil that drives the breaker 15, a case in which the hydraulic pressure sensor 16b measures a hydraulic pressure thereof will be explained as an example. However, a flow volume (for example, oil flow per minutes) may be measured. In this case, the measurement unit 16 includes, for example, a flowmeter.

Furthermore, the measurement unit 16 is provided to communicate with the terminal device 17 that is provided in the hydraulic excavator 10. The terminal device 17 acquires individual identifying information of the breaker 15 and the measured result from this measurement unit 16 that can be communicated with (Step S1-3).

Thus, in the present embodiment, the breakers 15 are individually identified, and individual identifying information and a measured result of each of these breakers 15 are acquired in association with each other. Therefore, as illustrated in FIG. 1C, even when, for example, the same breaker 15-1 is sequentially attached to working machines DIG_1, DIG_2, and RBT_1 so as to be used, an operation state of the individual breaker 15-1 can be acquired at any time regardless of a combination with the working machine.

Returning to the explanation of FIG. 1A, the server device 20 will be subsequently explained. The server device 20 is provided as, for example, a virtual server on the Internet W, and collects operation states of the breakers 15-1, 15-2, and 15-3, which are transmitted in Step S1, through the network N (Step S2).

The server device 20 analyzes each of the collected operation states so as to cumulate the analyzed state in a breaker operation information DataBase (DB) 22a (Step S3). The server device 20 provides, to the various terminals 30 and 40, operation information including contents of an analyzed result obtained by the analyzing for each of the breakers 15 (Step S4).

This information provision is performed in a browsing format using, for example, a Web screen. Therefore, a maintenance person of a maintenance base, a salesperson, an end user in actually using the target breaker 15, or the like, which has the various terminals 30 and/or 40, is able to browse operation information of the desired breaker 15 regardless of the time and place.

The operation information may include an abnormality in the breaker 15 and an indication thereof, which are estimated on the basis of, for example, a measured result of the measurement unit 16; an accumulated operation time and the present position of each breaker 15; and the like. For an abnormality of the breaker 15 and an indication thereof, an alarm notice may be performed, which indicates contents of this abnormality and this indication thereof.

Therefore, for example, a maintenance person is encouraged to perform maintenance before a component of the breaker 15 is seriously damaged, so that an increase in a repair cost can be prevented. One example of a method for estimating an abnormality of the breaker 15 and an indication thereof on the basis of a measured result of the measurement unit 16 will be explained later with reference to FIGS. 6A to 7B.

Moreover, for example, a forecast of maintenance associated with an aged deterioration and the like can be performed on the basis of an accumulated operation time of the breaker 15. A salesperson is able to accurately grasp operation information including an accumulated operation time for each of the breakers 15, and thus, for example, in a contract negotiation with an end user, an appropriate negotiation including a presentation of an appropriate timing of a component replacement and the like can be conducted. A replace time of a consumable part constituting the breaker 15 can be forecasted and announced.

Thus, according to the present embodiment, regardless of a combination with a working machine, not only an operation state of each of the breakers 15 can be monitored, but also the monitored result can assist each relevant person of a maintenance person, a salesperson, or an end user so that the quality of an operation activity thereof is improved.

Figure 2A:
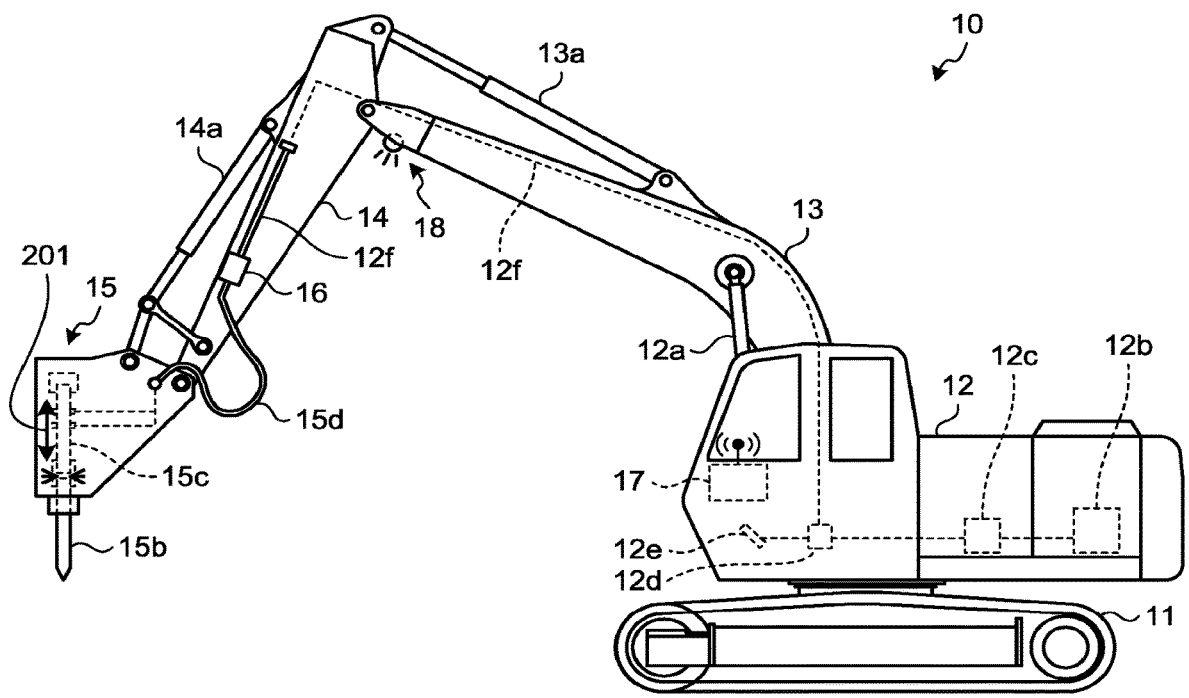
FIG. 2A is a diagram illustrating a configuration of a hydraulic excavator.

Hereinafter, composing elements constituting the breaker monitoring system 1 will be explained more specifically. FIG. 2A is a diagram illustrating a configuration of the hydraulic excavator 10. FIG. 2B is a diagram illustrating a configuration of the measurement unit 16.

As illustrated in FIG. 2A, the hydraulic excavator 10 includes, a crawler 11, a base unit 12, a boom 13, the arm 14, the breaker 15, the measurement unit 16, the terminal device 17, and a light 18.

The crawler 11 is a movement mechanism that is provided to realize movement on uneven ground, and is configured, for example, as an endless track as illustrated in FIG. 2A. The base unit 12 is provided to rotate around a vertical axis (not illustrated) with respect to the crawler 11, and includes a cockpit for handling.

The boom 13 is provided to swing around a horizontal axis (not illustrated) with respect to the base unit 12 at a base end part thereof. The boom 13 swings by expansion and contraction of a first cylinder 12a that connects the base unit 12 and the boom 13.

The arm 14 is provided to swing around a horizontal axis (not illustrated) with respect to a leading end part of the boom 13 at a base end part thereof. The arm 14 swings by expansion and contraction of a second cylinder 13a that connects the boom 13 and the arm 14.

The breaker 15 is provided at a leading end part of the arm 14 and is provided to swing around a horizontal axis (not illustrated) with respect to a leading end part of the arm 14. The breaker 15 swings by expansion and contraction of a third cylinder 14a that connects the arm 14 and the breaker 15.

Each of the first cylinder 12a, the second cylinder 13a, and the third cylinder 14a is a hydraulic cylinder, and, for convenience of explanation, illustration of a hydraulic system that causes these cylinders to expand and contract is omitted in FIG. 2A.

The base unit 12 includes therein a hydraulic oil tank 12b, a hydraulic pump 12c (corresponding to one example of "fluid pressure generating device"), a control valve 12d, and a foot pedal 12e. A pipe 12f (corresponding to one example of "first supply/discharge passage") for the breaker 15 extends along the boom 13 and the arm 14 from the control valve 12d.

The breaker 15 includes a chisel 15b, a cylinder 15c, and a hydraulic pressure hose 15d (corresponding to one example of "second supply/discharge passage"). The breaker 15 causes, in response to an operation for the foot pedal 12e by a working person, a piston of the cylinder 15c to continuously move up and down by a fluid pressure of hydraulic oil supplied from the hydraulic pump 12c side through the pipe 12f and the hydraulic pressure hose 15d (see arrow 201 illustrated in FIG. 2A). To this moving up and down, gas of nitrogen gas and the like sealed in an upper part of the piston of the cylinder 15c also contributes, and this gas accelerates the moving down piston by repelling against compression associated with moving up of the piston so as to give a strong striking force to the piston. In moving down of this piston, an impact force is transmitted to the chisel 15b by striking a base end part of the chisel 15b.

The chisel 15b strikes an object contacting with a leading end part thereof by the impact force transmitted from the piston so as to demolish the object. Herein, an operating principle of the breaker 15 has been already known, and thus a detailed explanation thereof is omitted.

The terminal device 17 is arranged in, for example, the cockpit of the base unit 12. A working person in the cockpit may carry the terminal device 17. The light 18 is arranged at, for example, a leading end part of the boom 13, and is used in a night-time work and the like. In the case illustrated in FIG. 2A, a power source for this light 18 is arranged near the leading end part of the boom 13.

The measurement unit 16 connects the pipe 12f and the hydraulic pressure hose 15d, and arranged at the arm 14. Specifically, as illustrated in FIG. 2B, the measurement unit 16 is arranged between the pipe 12f arranged from the hydraulic pump 12c side and the hydraulic pressure hose 15d arranged on the breaker 15 side, and connects the pipe 12f and the hydraulic pressure hose 15d. In other words, the measurement unit 16 functions as a joint between the pipe 12f and the hydraulic pressure hose 15d.

The measurement unit 16 includes a controller 16a including a communication unit and the like, the hydraulic pressure sensor 16b, the vibration sensor 16c, and a supply/discharge passage 16d. It is preferable that the controller 16a is arranged so as to be protected by, for example, a buffer material B. By employing this configuration, the controller 16a that is, so to speak, a delicate component part can be protected from a strong impact transmitted from the breaker 15. Impact absorption•vibration absorption material such as αGEL (registered trademark) may be used as the buffer material B.

The hydraulic pressure sensor 16b is arranged on the supply/discharge passage 16d, and detects a hydraulic pressure of the hydraulic oil that flows in the supply/discharge passage 16d. The vibration sensor 16c detects a vibration, which is transmitted to the arm 14, when the breaker 15 is driven. The aforementioned power source for the light 18 can be used as a power supply source to the measurement unit 16. By employing such a configuration, the measurement unit 16 can be arranged at a position where the measurement unit 16 receives less impact than the case where the measurement unit 16 is directly arranged at the breaker 15 and a position where a vibration and a hydraulic pressure of the breaker 15 can be measured.

Figure 2B:
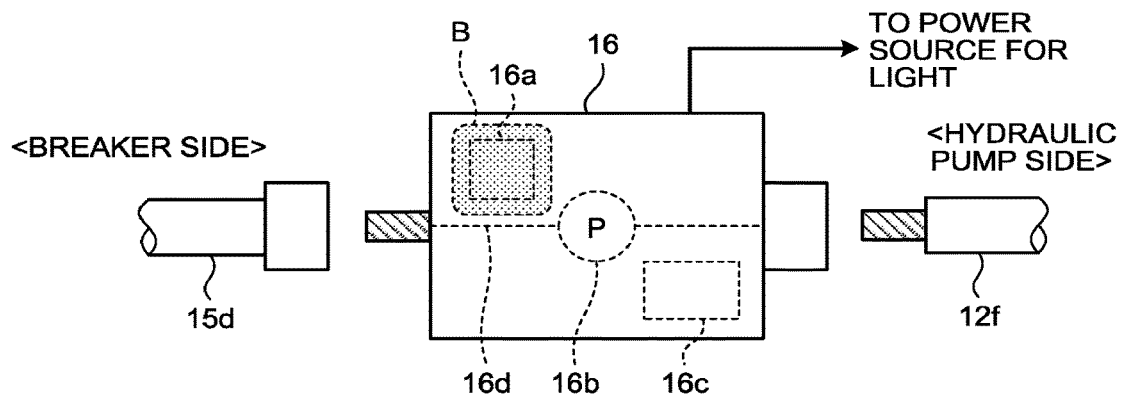
FIG. 2B is a diagram illustrating a configuration of a measurement unit.

In FIG. 2B, arrangement of various devices in the measurement unit 16 is schematically illustrated, however, is merely for convenience of explanation, and thus arrangement positions of these various positions in the measurement unit 16 are not limited thereto. In FIG. 2B, with respect to a power source of the measurement unit 16, the example in which the power source for the light 18 is used is illustrated, however, a power supply mode to the measurement unit 16 is not limited thereto, and the power may be supplied by a battery, or wireless power supply may be used, for example.

Next, FIG. 3 is a block diagram illustrating the breaker monitoring system 1 according to the present embodiment. In FIG. 3, composing elements needed for explaining features of the present embodiment are illustrated by functional blocks, and description of common composing elements will be omitted.

In other words, each of the composing elements illustrated in FIG. 3 is conceptual, and is not needed to be physically configured as illustrated. For example, specific forms of distribution and integration of the functional blocks are not limited to those illustrated in the drawings, and all or some thereof can be configured by separating or integrating functionally or physically in any unit, according to various types of loads, the status of use, etc. For example, in a case where a flow volume of the aforementioned hydraulic oil is further measured, a flowmeter is added to an inner part of the measurement unit 16.

In the explanation with reference to FIG. 3, explanation of already-described composing elements may be simplified or omitted in some cases.

First, the hydraulic excavator 10 will be explained. As described above, as illustrated in FIG. 3, the hydraulic excavator 10 includes the breaker 15, the measurement unit 16, and the terminal device 17. The breaker 15 holds individual identifying information by using the IC tag 15a.

The measurement unit 16 includes the controller 16a, the hydraulic pressure sensor 16b, the vibration sensor 16c, and communication interfaces 16e and 16f. The communication interface 16e is an interface that corresponds to a communication standard for Near Field Communication, for example. The communication interface 16f is an interface that corresponds to Bluetooth (registered trademark), for example.

The controller 16a includes an acquisition unit 16aa and a communication unit 16ab. The acquisition unit 16aa acquires individual identifying information of the breaker 15 from the IC tag 15a by using a communication with the breaker 15 side through the communication interface 16e.

The communication unit 16ab transmits, to the terminal device 17, a detected result of the hydraulic pressure sensor 16b and a detected result of the vibration sensor 16c of individual identifying information of each of the breakers 15, which are acquired by the acquisition unit 16aa through the communication interface 16f. The communication unit 16ab has a function that performs analog-digital conversion on the detected result of the hydraulic pressure sensor 16b and the detected result of the vibration sensor 16c.

The terminal device 17 includes a controller 17a and communication interfaces 17b and 17c. The communication interface 17b is an interface that corresponds to, for example, Bluetooth (registered trademark) according to the aforementioned communication interface 16f. The communication interface 17c is an interface that corresponds to, for example, the network N, in other words, a mobile telephone line network. Herein, the case where a communication mode between the measurement unit 16 and the terminal device 17 is a wireless communication is exemplified. However, the communication mode may be a wired communication. Therefore, the communication interfaces 16f and 17b may be interfaces that correspond to a standard for a wired communication. Moreover, the network N is not limited to a mobile telephone line network, and may be one using a wireless LAN and the like.

The controller 17a includes a data forming unit 17aa and a communication unit 17ab. The data forming unit 17aa executes a process for data cleansing on a detected result of the hydraulic pressure sensor 16b and a detected result of the vibration sensor 16c of individual identifying information of each of the breakers 15, which is received through the communication interface 17b and the communication unit 17ab.

The communication unit 17ab transmits, to the network N, data on which data cleansing is performed by the data forming unit 17aa through the communication interface 17c.

Herein, one example of a format of data transmitted by the measurement unit 16 and the terminal device 17 will be explained. FIG. 4A is a diagram illustrating one example of a format of data transmitted by the measurement unit 16. FIG. 4B is a diagram illustrating one example of a format of data transmitted by the terminal device 17.

As illustrated in FIG. 4A, the measurement unit 16 transmits, to the terminal device 17, data having a data format that associates, for example, individual identifying information of the breaker 15 with a detected result of the hydraulic pressure sensor 16b and a detected result of the vibration sensor 16c.

On the other hand, as illustrated in FIG. 4B, the terminal device 17 performs, by using the data forming unit 17aa, data cleansing that includes, for example, compression of data such that a communication efficiency improves, deletion of an unneeded part such that a process efficiency improves, and compensation of a lacking part, on the data received from the measurement unit 16.

The data having a formed data format on which this data cleansing is performed may be also transmitted to the network N after addition of information on, for example, the present position. For example, when the terminal device 17 includes a device corresponding to a Global Positioning System (GPS) unit that executes a process for acquiring the present position of the own device on the basis of an electric wave received from a GPS satellite, the present position can be acquired, for example.

The GPS unit may be included in, for example, the hydraulic excavator 10 itself, or, when the terminal device 17 is, for example, a mobile telephone and the like held by a working person in the cockpit, a GPS unit included in this mobile telephone may be used.

Returning to explanation of FIG. 3, the server device 20 will be subsequently explained. As illustrated in FIG. 3, the server device 20 includes a controller 21, a memory 22, and a communication interface 23. The controller 21 includes a communication unit 21a, a collection unit 21b, an analyzing unit 21c, a cumulating unit 21d, and a providing process unit 21e.

The memory 22 is a memory device such as a hard disk drive and a non-volatile memory, and memorizes the breaker operation information DB 22a. The communication interface 23 is an interface that handles connection to the Internet W.

The controller 21 controls the whole of the server device 20. The communication unit 21a executes a process for sending and receiving data through the communication interface 23. The collection unit 21b executes a process for properly collecting operation states of the breakers 15 via the communication interface 23 and the communication unit 21a. The collection unit 21b also executes a process for passing the collected operation states of the breakers 15 to the analyzing unit 21c.

The analyzing unit 21c executes a process for analyzing each of the collected operation states of the breakers 15. The analyzing unit 21c also executes a process for passing analyzed results obtained by the analyzing to the cumulating unit 21d. When a content that indicates, for example, an abnormality of the breaker 15 and an indication thereof is included in the analyzed result obtained by the analyzing, the analyzing unit 21c performs, on the providing process unit 21e, a process request for an alarm notice according to this abnormality and the indication thereof.

The cumulating unit 21d executes a process for cumulating operation information of each of the breakers 15, which includes a present state of the corresponding breaker 15, in the breaker operation information DB 22a on the basis of the analyzed result of the analyzing unit 21c.

When receiving the process request for the alarm notice performed by the analyzing unit 21c, the providing process unit 21e executes a process for generating an alarm notice in response to this process request and transmitting the generated alarm notice to the various terminals 30 and 40 and the terminal device 17 via the communication unit 21a and the communication interface 23.

For example, when receiving a provision request for operation information of the desired breaker 15 from the various terminals 30 and 40 or the terminal device 17 via the communication interface 23 and the communication unit 21a, the providing process unit 21e executes a process for extracting operation information according to this provision request from the breaker operation information DB 22a.

The providing process unit 21e also executes, on the basis of the extracted operation information, a process for generating a browsing screen of the operation information while adding a graph, an image, and the like thereto and transmitting the generated browsing screen to the various terminals 30 and 40 and the terminal device 17 via the communication unit 21a and the communication interface 23 so that a reader can grasp it on a Web screen at a glance, for example.

Next, a specific example of a format of data cumulated in the breaker operation information DB 22a will be explained with reference to FIGS. 5A and 5B. FIG. 5A is a diagram illustrating one example of a format of data cumulated in the breaker operation information DB 22a. FIG. 5B is a diagram illustrating a modification of "accumulated operation time" illustrated in FIG. 5A.

As illustrated in FIG. 5A, in the breaker operation information DB 22a, for example, operation information on operation states of the respective breakers 15 that are identified by "breaker individual identifying information" is cumulated at any time. For example, in FIG. 5A, operation information of the breakers 15 whose pieces of "breaker individual identifying information" are identified by respective BR_1, BR_2, and BR_3 is illustrated as one example.

For example, in the breaker operation information DB 22a, "accumulated operation time" of each of the breakers 15 of BR_1, BR_2, and BR_3 is cumulated. This "accumulated operation time" is an accumulated operation time of the individual breaker 15, which has no relation to a working machine to which the breaker 15 is attached.

For example, in the breaker operation information DB 22a, "present position" of each of the breakers 15 of BR_1, BR_2, and BR_3 is stored. This "present position" can be used, for example, not only in checking a presence position of the breaker 15, but also in searching in a case where the breaker 15 is stolen.

For example, in the breaker operation information DB 22a, "present status" of each of the breakers 15 of BR_1, BR_2, and BR_3 is stored. In "present status", for example, values indicating "normal", "attention calling", and "abnormality" are stored, and in a case of "attention calling", the providing process unit 21e executes a process for performing an alarm notice indicating "attention calling" for a relevant person (maintenance person or end user) of the breaker 15 of BR_2 corresponding to "attention calling". When receiving this alarm notice, the relevant person is able to make a work preparation for preventive maintenance against an abnormality occurrence.

For example, in a case of "abnormality", the providing process unit 21e executes a process for performing an alarm notice indicating "abnormality" for a relevant person of the breaker 15 of BR_3 corresponding to "abnormality". When receiving this alarm notice, for example, the relevant person is able to immediately perform a repair work in case a failure in the breaker 15 advances further by the abnormality to increase a repair cost.

For example, the breaker operation information DB 22a can include present "connected machine", past "alarm history", "lease history", and the like for each of the breakers 15 of BR_1, BR_2, and BR_3.

Herein, "alarm history" can be used for a guide indicating, for example, whether or not this breaker 15 is failure-prone. Moreover, when "lease history" is added, "alarm history" can be used for a guide indicating, for example, whether or not this breaker 15 is a good quality item that hardly fails.

For example, when "alarm history" is small amount whereas "lease history" is large amount, the breaker 15 corresponding thereto can be determined as a good quality item that hardly fails, and thus a salesperson is able to present the breaker 15 as the recommended breaker 15 to an end user, for example.

Meanwhile, in FIG. 5A, unitary "accumulated operation time" is illustrated, however as illustrated in FIG. 5B, this "accumulated operation time" may be sectioned more finely to be cumulated. For example, as illustrated in FIG. 5B, in "accumulated operation time", accumulations of respective "normal striking time" in which normal striking to an object is performed, "blank blowing time" and "sweeping time" in which an abnormality may induced in the breaker 15, and the like may be cumulated.

Figure 6A:
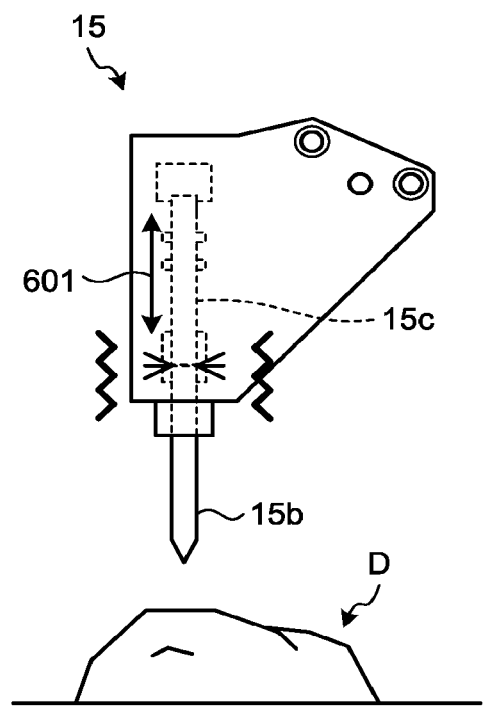
FIG. 6A is a diagram illustrating "blank blowing" performed by a breaker.
Figure 6B:
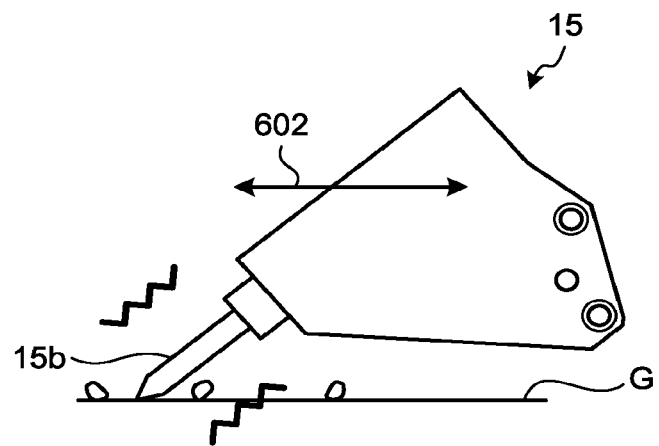
FIG. 6B is a diagram illustrating "sweep" performed by the breaker.

Herein, "blank blowing" and "sweep" performed by the breaker 15 will be explained with reference to FIGS. 6A and 6B. FIG. 6A is a diagram illustrating "blank blowing" performed by the breaker 15. FIG. 6B is a diagram illustrating "sweep" performed by the breaker 15.

As illustrated in FIG. 6A, "blank blowing" indicates an operation state in which a piston of the cylinder 15c moves up and down in a state where the chisel 15b do not contact with an object D to be demolished (see arrow 601 in FIG. 6A). When this "blank blowing" is performed, the impact force that is transmitted to the chisel 15b caused by strikes from the cylinder 15c is not transmitted to the object D so as to strike the breaker 15 itself, and thus an abnormality is easily induced in the breaker 15 itself.

As illustrated in FIG. 6B, "sweep" indicates an operation state in which the chisel 15b operates so as to sweep, for example, crushed pieces lying around on the ground G and the like (see arrow 602 in FIG. 6B). When this "sweep" is performed, for example, needless vibration is transmitted to the breaker 15 by the contact with the ground G in spite of the fact that the breaker 15 does not perform striking, and thus an abnormality is also easily induced in the breaker 15.

The server device 20 can cause the analyzing unit 21c to estimate operation states of each of the breakers 15, such as "blank blowing" and "sweep", on the basis of a combination of a detected result of the hydraulic pressure sensor 16b and a detected result of the vibration sensor 16c of the corresponding breaker 15 of the corresponding breakers 15.

Figure 7A:
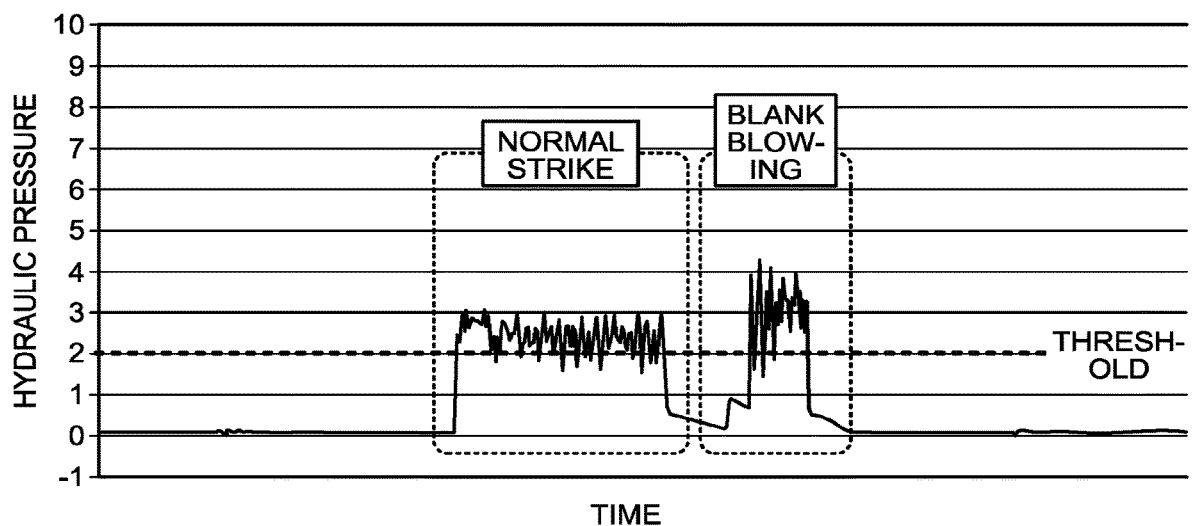
FIGS. 7A and 7B are diagrams illustrating examples of estimation of operation states of the breaker.
Figure 7B:
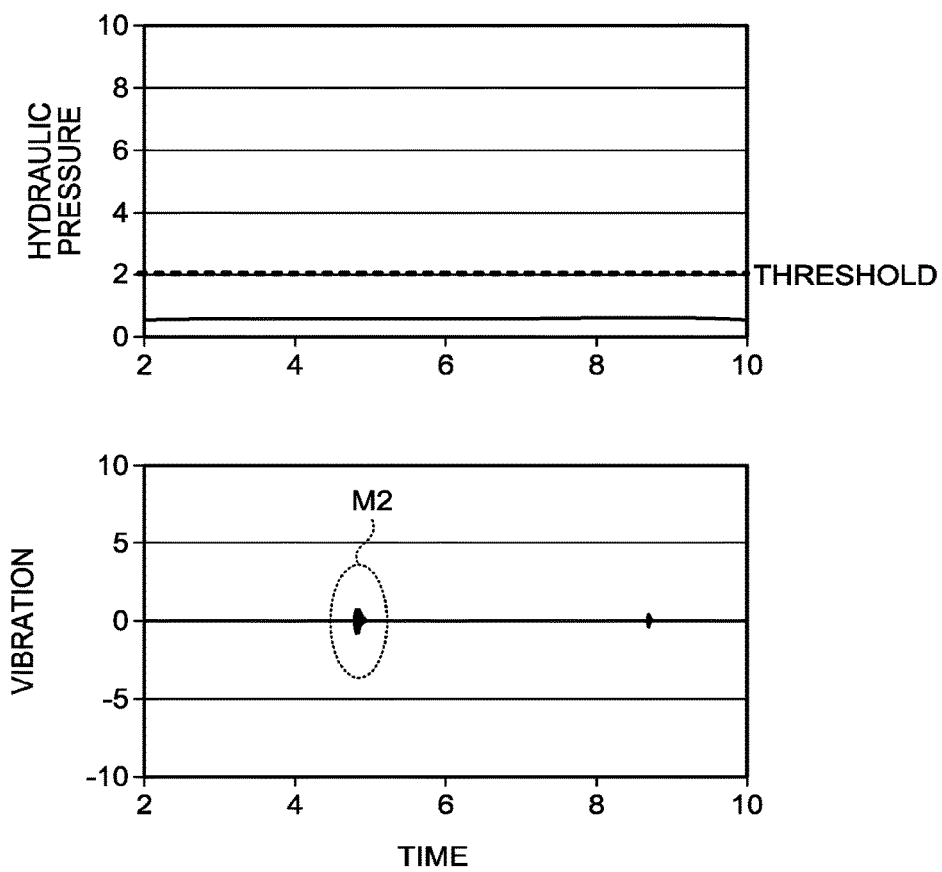

One example of this case will be explained with reference to FIGS. 7A and 7B. FIGS. 7A and 7B are diagrams illustrating examples of estimation of operation states of the breaker 15. A combination of a detected result of the hydraulic pressure sensor 16b and a detected result of the vibration sensor 16c may include a case where any one of the aforementioned detected results is used.

For example, as illustrated in FIG. 7A, the analyzing unit 21c can estimate whether an operation state of the breaker 15 is "normal strike" or "blank blowing" on the basis of a detected result of the hydraulic pressure sensor 16b. Specifically, when a hydraulic pressure detected by the hydraulic pressure sensor 16b indicates a waveform that exceeds a predetermined threshold indicating that the breaker 15 is in a striking state, the analyzing unit 21c estimates whether the operation state is "normal strike" or "blank blowing" by, for example, a form of this waveform.

In other words, as illustrated in FIG. 7A, the analyzing unit 21c estimates, as "blank blowing", a case where, for example, a form of a waveform largely exceeds a predetermined threshold and is steeper. The analyzing unit 21c estimates, as "normal strike", a case where a form of a waveform exceeds the predetermined threshold, but is less steep and broader than that of "blank blowing".

The analyzing unit 21c segments time widths that are respectively estimated as "normal strike" and "blank blowing", and, for example, accumulates these "normal strike" and "blank blowing" in "normal striking time" and "blank blowing time" of "accumulated operation time" illustrated in FIG. 5B.

Not illustrated in FIG. 7A, when a form of a waveform does not exceed the aforementioned predetermined threshold whereas, for example, the breaker 15 is in a striking state, the analyzing unit 21c may estimate that, for example, there exists "setting abnormity" in the breaker 15. In this case, by causing the providing process unit 21e to perform an alarm notice indicating the fact that there exists "setting abnormity" to a relevant person of the corresponding breaker 15, the corresponding relevant person can be encouraged to immediately perform a check of a setting of the breaker 15.

For example, as illustrated in FIG. 7B, the analyzing unit 21c can estimate whether or not an operation state of the breaker 15 is "sweep" on the basis of a detected result of the hydraulic pressure sensor 16b and a detected result of the vibration sensor 16c. Specifically, when a hydraulic pressure detected by the hydraulic pressure sensor 16b indicates a waveform indicating that the waveform is less than a predetermined threshold, namely the breaker 15 is in a strike standby state, and, for example, the vibration sensor 16c detects a vibration (see part M2 illustrated in FIG. 7B), the analyzing unit 21c estimates that this case is "sweep".

The analyzing unit 21c segments a time width estimated as "sweep", and accumulates it in, for example, "sweeping time" of "accumulated operation time" illustrated in FIG. 5B.

In this case, the analyzing unit 21c causes the providing process unit 21e to perform an alarm notice indicating the fact of "avoid sweeping because abnormality is likely to be induced" to an end user that is actually using the corresponding the breaker 15, and thus the end user is encouraged to perform an operation that is suitable for the preventive maintenance against an abnormality.

Thus, the server device 20 estimates an operation state of the breaker 15 on the basis of a combination of a detected result of the hydraulic pressure sensor 16b and a detected result of the vibration sensor 16c for each of the breakers 15. Moreover, other than the aforementioned examples, the analyzing unit 21c may compute a striking force of the breaker 15 on the basis of, for example, a detected result of the hydraulic pressure sensor 16b so as to determine whether or not this computed result is within a range of a performance value of the breaker 15. The analyzing unit 21c may compute the number of strikes of the piston of the cylinder 15c (see FIG. 2A) per a predetermined time (for example, minute) on the basis of, for example, a detected result of the vibration sensor 16c so as to determine whether or not this computed result is within a range of a performance value of the breaker 15. By using these determined results, for example, the aforementioned "setting abnormity" can be estimated. Not limited to a hydraulic pressure and a vibration, as described above, for example, a flow volume of the hydraulic oil may be measured, and an analysis in which the measured result is additionally combined may be performed so as to estimate an operation state of the breaker 15.

Therefore, according to the present embodiment, an operation state of each of the breakers 15 can be monitored along with more specific contents, and a relevant person can be helped to perform an appropriate work according to the contents.

As described above, the breaker monitoring system 1 (corresponding to one example of "attachment monitoring system") according to the first embodiment includes the hydraulic excavator 10 (corresponding to one example of "working machine"), the breakers 15 (corresponding to one example of "attachments"), the measurement unit 16, the terminal device 17, and the server device 20.

The hydraulic excavator 10 includes the arm 14 (corresponding to one example of "working arm"). Each of the breakers 15 is attached to a leading end part of the arm 14 so as to driven by a hydraulic pressure (corresponding to one example of "fluid pressure"). The measurement unit 16 is provided to measure a vibration and a hydraulic pressure when each of the breakers 15 identified on the basis of individual identifying information is driven.

The terminal device 17 is provided in the hydraulic excavator 10 to acquire measured results of the measurement unit 16. The server device 20 collects the measured results of the respective breakers 15 from the terminal device 17, and analyzes operation states of the respective breaker 15 on the basis of the collected measured results.

Therefore, by employing the breaker monitoring system 1 according to the present embodiment, an operation state of each of the breakers 15 can be monitored.

Meanwhile, in the aforementioned first embodiment, the case in which individual identifying information of the breaker 15 is held by the IC tag 15a on the breaker 15, and the acquisition unit 16aa of the measurement unit 16 acquires individual identifying information from the IC tag 15a by using a wireless communication is exemplified, however, is not limited thereto. For example, the individual identifying information may be input by using a manual input. This case will be explained with reference to FIG. 8 as a second embodiment.

Second Embodiment

Figure 8:
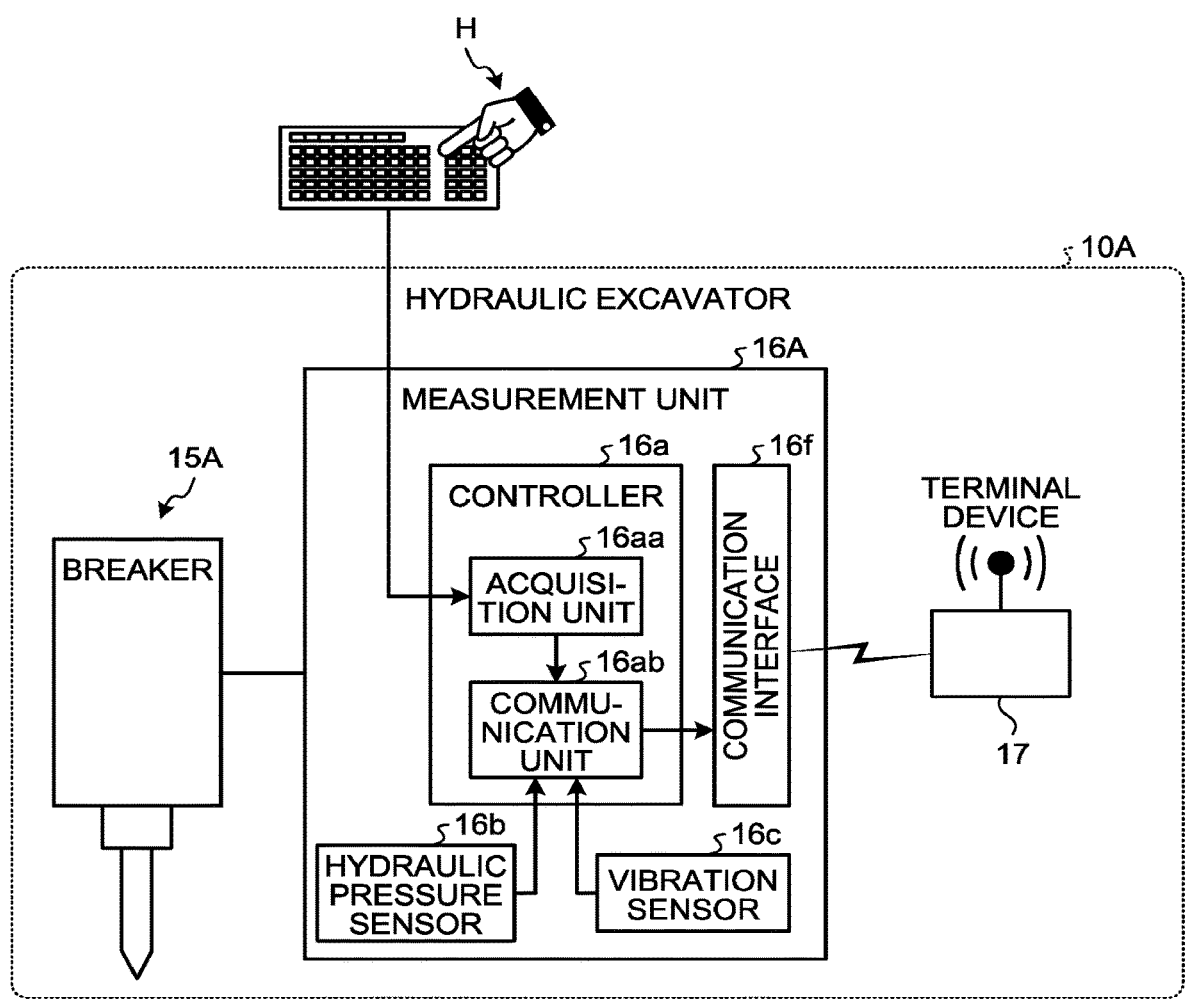
FIG. 8 is a block diagram illustrating a hydraulic excavator according to a second embodiment.

FIG. 8 is a block diagram illustrating a hydraulic excavator 10A according to the second embodiment. FIG. 8 corresponds to the block diagram of the hydraulic excavator 10 illustrated in FIG. 3, and thus explanation of overlapped parts is omitted and a part different from that illustrated in FIG. 3 will be explained.

As illustrated in FIG. 8, a breaker 15A of the hydraulic excavator 10A does not include the IC tag 15a. A measurement unit 16A does not include the communication interface 16e corresponding to the breaker 15A.

The acquisition unit 16aa receives, in, for example, a setting for attaching the breaker 15A, for example, a manual input H so as to acquire individual identifying information of the breaker 15A. The acquired individual identifying information is held in an inner memory (not illustrated) of the measurement unit 16A and the like, and is associated with a detected result of the hydraulic pressure sensor 16b and a detected result of the vibration sensor 16c so as to be transmitted to the terminal device 17.

When employing the hydraulic excavator 10A according to the second embodiment, because the IC tag 15a and the communication interface 16e for the RFID become unneeded, there exists a merit of contributing to cost reduction of the measurement unit 16A. In the second embodiment, whereas the manual input H is used, the acquisition unit 16aa acquires, similarly to the case of the first embodiment, individual identifying information of the individual breaker 15A, which has no relation to a combination with a working machine. Therefore, even when a combination between the breaker 15A and a working machine changes, an operation state of each of the breakers 15A is enabled to be collected on the basis of the acquired individual identifying information while inheriting the operation states between working machines. Therefore, similarly to the case according to the first embodiment, an operation state of each of the breakers 15A can be monitored also according to the second embodiment.

Third and Fourth Embodiments

Meanwhile, in the aforementioned embodiments, the case in which the measurement units 16 and 16A includes both the hydraulic pressure sensor 16b and the vibration sensor 16c is exemplified, however, only one of the hydraulic pressure sensor 16b and the vibration sensor 16c may be included.

Figure 9:
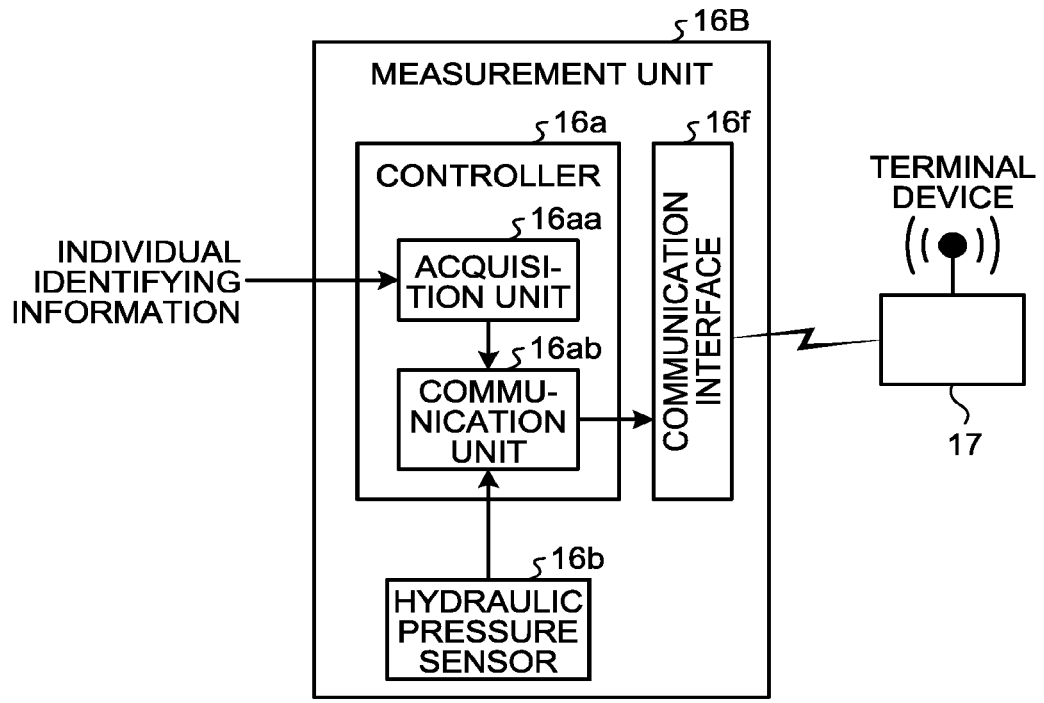
FIG. 9 is a block diagram illustrating a measurement unit according to a third embodiment.
Figure 10:
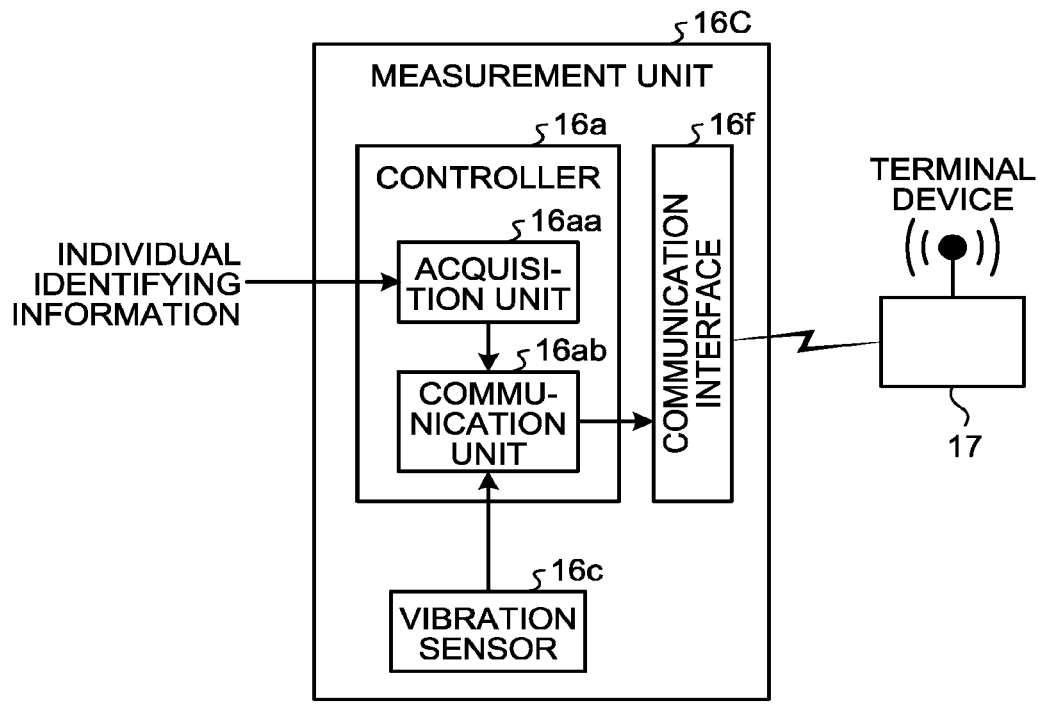
FIG. 10 is a block diagram illustrating a measurement unit according to a fourth embodiment.

FIG. 9 is a block diagram illustrating a measurement unit 16B according to a third embodiment. FIG. 10 is a block diagram illustrating a measurement unit 16C according to a fourth embodiment. FIGS. 9 and 10 corresponds to block diagrams of the measurement units 16 and 16A illustrated in FIGS. 3 and 8, however for convenience of explanation, illustration of the breakers 15 and 15A, the communication interface 16e (see FIG. 3), and the manual input H (see FIG. 8) is omitted. The acquisition unit 16aa is assumed to acquire, similarly to the explanations described above, individual identifying information of the breakers 15 and 15A by using the communication interface 16e and the manual input H, respectively.

As illustrated in FIG. 9, for example, the measurement unit 16B according to the third embodiment may include only the hydraulic pressure sensor 16b of the hydraulic pressure sensor 16b and the vibration sensor 16c. In this case, for example, the analyzing unit 21c (see FIG. 3) estimates whether an operation state of the breaker 15 or 15A is "normal strike" or "blank blowing" on the basis of only this detected result of the hydraulic pressure sensor 16b.

Specifically, as is already explained in FIG. 7A, when a hydraulic pressure detected by the hydraulic pressure sensor 16b indicates a waveform that exceeds a predetermined threshold indicating that the breaker 15 or 15A is in a striking state, for example, the analyzing unit 21c estimates whether the operation state thereof is "normal strike" or "blank blowing" by, for example, a form of this waveform.

The form of the waveform can be determined on the basis of, for example, a data set, for learning, of hydraulic pressure data by using a pattern identifier such as a Support Vector Machine (SVM), a determination model generated by performance of machine learning using the deep learning, etc. Moreover, an operation state of the breaker 15 or 15A other than "normal strike" and "blank blowing" may be estimated by using this determination model. For example, whether an operation state of the breaker 15 or 15A is "normal strike" or other states may be roughly estimated.

Moreover, "normal strike" is a striking state in which the breakers 15 and 15A are appropriately used in a state where all of the component parts thereof are in a normal state, and thus may be rephrased as "appropriate strike". Therefore, when machine learning based on hydraulic pressure data of this "appropriate strike" is performed, for example, a case in which an abnormality occurred in any one of the component parts can be determined. Specifically, for example, when consumption of a consumable part, such as a bush that supports up-and-down movements of the chisel 15b, advances, behavior of hydraulic pressure data becomes different from that of "appropriate strike", and thus a state where "appropriate strike" is not performed, so to speak, "abnormality strike" can be determined. Thus, for example, because ablation and deterioration of the aforementioned bush and the like can be estimated, an advance in consumption of a consumable part can be announced or exchange thereof can be suggested, to an end user.

In other words, the measurement unit 16B according to the third embodiment can monitor an operation state of each of the breakers 15 and 15A that can be estimated on the basis of a detected result of at least only the hydraulic pressure sensor 16b. Therefore, similarly to the cases according to the first and the second embodiments, also in the third embodiment, an operation state of each of the breakers 15 can be monitored regardless of a combination with a working machine, in other words, while inheriting the operation states between working machines.

When the measurement unit 16B according to the third embodiment is employed, because the vibration sensor 16c becomes unneeded, there exists a merit of contributing to cost reduction of the measurement unit 16B.

As illustrated in FIG. 10, for example, the measurement unit 16C according to the fourth embodiment may include only the vibration sensor 16c of the hydraulic pressure sensor 16b and the vibration sensor 16c. In this case, for example, the analyzing unit 21c determines whether or not inappropriate use during non-operation time is performed on the breakers 15 and 15A on the basis of only this detected result of the vibration sensor 16c.

The non-operation time indicates that the breakers 15 and 15A are in a strike standby state. The inappropriate use indicates a discommended usage of the breakers 15 and 15A. This inappropriate use in the non-operation time includes, for example, the aforementioned "sweep", "pry", and the like. Herein, "pry" is a usage of strongly twisting the chisel 15b after inserting the chisel 15b into a gap, a hole, or the like of an object.

Specifically, when the vibration sensor 16c detects such a vibration that has been already illustrated in FIG. 7B as the part M2, for example, the analyzing unit 21c segments data of this vibration and performs, for example, a Fast Fourier Transform (FFT) calculation thereon so as to generate a frequency spectrum of the vibration.

The analyzing unit 21c analyzes this frequency spectrum to estimate, for example, from which part of the breakers 15 and 15A a frequency having a high level value is generated. For example, when this part is estimated to be the chisel 15b and a behavior of the vibration data indicates that the breakers 15 and 15A are not in non-operation time, the analyzing unit 21c can estimate that an inappropriate use in a non-operation time, such as "sweep" and "pry", is performed on the breakers 15 and 15A in a time corresponding to the part M2.

Herein, the case of determination of whether or not an inappropriate use in a non-operation time is performed on the breakers 15 and 15A is exemplified, needless to say, an abnormality in an operation case or that in an appropriately used case may be estimated. Therefore, for example, when generation of an abnormality caused by a consumable part is estimated by a frequency analysis of vibration data whereas the breakers 15 and 15A are appropriately used, an advance in consumption of the consumable part may be announced, or exchange thereof may be suggested, to an end user.

In other words, by employing the measurement unit 16C according to the fourth embodiment, an operation state of each of the breakers 15 and 15A, which can be estimated on the basis of a detected result of at least only the vibration sensor 16c, can be monitored. Therefore, similarly to the cases according to the first, the second, and the third embodiments, also in the fourth embodiment, an operation state of each of the breakers 15 and 15A can be monitored regardless of a combination with a working machine, in other words, while inheriting the operation states between working machines.

When employing the measurement unit 16C according to the fourth embodiment, because the hydraulic pressure sensor 16b becomes unneeded, there exists a merit of contributing to cost reduction of the measurement unit 16C. Needless to say, the methods for analyzing hydraulic pressure data and vibration data, which have been explained in the third and the fourth embodiments, may be employed in the first and second embodiments.

In the aforementioned embodiments, the arm 14 corresponds to one example of a working arm and the measurement unit 16 is arranged on this working arm, however, the working arm may include the boom 13. In other words, in a case where the measurement unit 16 is in a communication available range with the IC tag 15a and a vibration and a hydraulic pressure when the breaker 15 is driven can be measured, the measurement unit 16 may be arranged at the boom 13.

In the aforementioned embodiments, the measurement unit 16 is arranged on the working arm, however, when durability and measuring performance of the measurement unit 16 is secured by the rigidity of a housing of the measurement unit 16, protection of component parts in the measurement unit 16 using the buffer material B and the like, etc., the measurement unit 16 may be arranged at the breaker 15.

In the aforementioned embodiments, the case in which the breaker 15 can be driven by a hydraulic pressure is exemplified, as described above, a gas pressure of nitrogen gas and the like may be additionally used. Or only a gas pressure may be used. When employing these cases, it is sufficient that a sensor corresponding to the hydraulic pressure sensor 16b can measure a fluid pressure including a gas pressure.

In the aforementioned embodiments, the case in which each of the measurement units 16, 16A, 16B, and 16C acquires individual identifying information of the breakers 15 and 15A, the terminal device 17 may acquire the individual identifying information to individually identify the breakers 15 and 15A. In this case, each of the measurement units 16, 16A, 16B, and 16C transmits a detected result of the sensors 16b or 16c to the terminal device 17, and the terminal device 17 associates the individual identifying information with the detected result of the sensor 16b or 16c.

In the aforementioned embodiments, the case in which the analyzing unit 21c is arranged in the server device 20 is exemplified, the analyzing unit 21c may be arranged in the terminal device 17. In this case, the terminal device 17 executes a process for analyzing an operation state of the breakers 15 or 15A on the basis of a measured result measured by each of the measurement units 16, 16A, 16B, and 16C so as to transmit the analyzed result to the server device 20 through the data forming unit 17aa and the communication unit 17ab, for example. When an analyzed result includes, for example, an abnormality in the breaker 15 or 15A, or an indication thereof, the terminal device 17 may first perform an alarm notice according to this abnormality or this indication thereof on a display of the terminal device 17 itself and the like. In the server device 20, the collection unit 21b collects analyzed results in the terminal devices 17, and the cumulating unit 21d cumulates operation information of the breakers 15 and 15A in the breaker operation information DB 22a on the basis of the collected analyzed results.

In the aforementioned embodiments, the case in which an attachment corresponds to the breaker 15 or 15A is exemplified, however, a kind of the attachment is not limited thereto. Any of, for example, a bucket, a hydraulic crusher, a hydraulic cutter, and the like may be attached as the attachment.

In the aforementioned embodiments, the case in which a working machine is the hydraulic excavator 10 or 10A is exemplified, however, a kind of the working machine is not limited thereto. If a working machine includes a working arm and an attachment can be attached to this working arm, for example, the working machine may be a robot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An attachment monitoring system comprising:
    a working machine that includes a working arm movably supported by a body of the working machine;
    a plurality of attachments each of which is attached to a leading end part of the working arm so as to be driven by a fluid pressure;
    a measurement unit that is disposed on the working arm movably supported by the body of the working machine and connected to each of the attachments, the measurement unit being separately arranged from an attached attachment, the measurement unit configured to (i) identify each of the attachments based on individual identifying information and (ii) measure at least one of a vibration and the fluid pressure when each of the identified attachments is driven;
    a terminal device that is provided in the working machine, the terminal device acquiring measured results of the measurement unit; and
    a server device that collects the measured results of the respective attachments from the terminal device, and analyzes operation states of the respective attachments based on the collected measured results.

2. The attachment monitoring system according to claim 1, wherein the measurement unit includes:
    an acquisition unit that acquires the individual identifying information,
    at least one of a vibration sensor that detects a vibration of the attached attachment and a fluid pressure sensor that detects the fluid pressure, and
    a communication unit that transmits, to the terminal device, at least one of a detected result of the vibration sensor and a detected result of the fluid pressure sensor as one of the measured results.

3. The attachment monitoring system according to claim 2, wherein the server device estimates an operation state of each of the attachments based on at least one of the detected result of the vibration sensor and the detected result of the fluid pressure sensor of the corresponding attachment.

4. The attachment monitoring system according to claim 2, wherein
    the individual identifying information is held on the attachments,
    the acquisition unit acquires the individual identifying information by using communication with the attached attachment, and the communication unit transmits, to the terminal device, the one measured result corresponding to the individual identifying information acquired by the acquisition unit.

5. The attachment monitoring system according to claim 2, wherein the measurement unit further includes a buffer material that is provided to protect at least the communication unit.

6. The attachment monitoring system according to claim 1, wherein the measurement unit is provided to measure a flow volume of the fluid that drives the attached attachment.

7. The attachment monitoring system according to claim 1, wherein
the working machine includes a hydraulic excavator, and
the attached attachment includes a hydraulic breaker.

8. An attachment monitoring system comprising:
a working machine that includes a working arm;
a plurality of attachments each of which is attached to a leading end part of the working arm so as to be driven by a fluid pressure;
a measurement unit that is disposed on the working arm and connected to each of the attachments, the measurement unit being separately arranged from an attached attachment, the measurement unit configured to (i) identify each of the attachments based on individual identifying information and (ii) measure at least one of a vibration and the fluid pressure when each of the identified attachments is driven;
a terminal device that is provided in the working machine, the terminal device acquiring measured results of the measurement unit and
a server device that collects the measured results of the respective attachments from the terminal device, and analyzes operation states of the respective attachments based on the collected measured results,
wherein
the working machine includes:
a fluid pressure generating device that generates the fluid pressure, and
a first supply/discharge passage that is a supply/discharge passage of a fluid from the fluid pressure generating device,
wherein each of the attachments includes a second supply/discharge passage that is a supply/discharge passage of the fluid to the corresponding attachment, and
wherein the measurement unit is disposed between the first supply/discharge passage and each second supply/discharge passage such that the measurement unit is connected to both the first supply/discharge passage and each second supply/discharge passage to receive the fluid from the first supply/discharge passage and provide the received fluid to each second supply/discharge passage.

9. The attachment monitoring system according to claim 8, wherein the measurement unit includes:
an acquisition unit that acquires the individual identifying information,
at least one of a vibration sensor that detects a vibration of the attached attachment and a fluid pressure sensor that detects the fluid pressure, and
a communication unit that transmits, to the terminal device, at least one of a detected result of the vibration sensor and a detected result of the fluid pressure sensor as one of the measured results.

10. The attachment monitoring system according to claim 9, wherein the server device estimates an operation state of each of the attachments based on at least one of the detected result of the vibration sensor and the detected result of the fluid pressure sensor of the corresponding attachment.

11. The attachment monitoring system according to claim 9, wherein
the individual identifying information is held on the attachments,
the acquisition unit acquires the individual identifying information by using communication with the attached attachment, and
the communication unit transmits, to the terminal device, the one measured result corresponding to the individual identifying information acquired by the acquisition unit.

* * * * *